Jan. 23, 1951     C. H. O. BERG     2,539,005
ADSORPTION PROCESS
Filed April 30, 1949
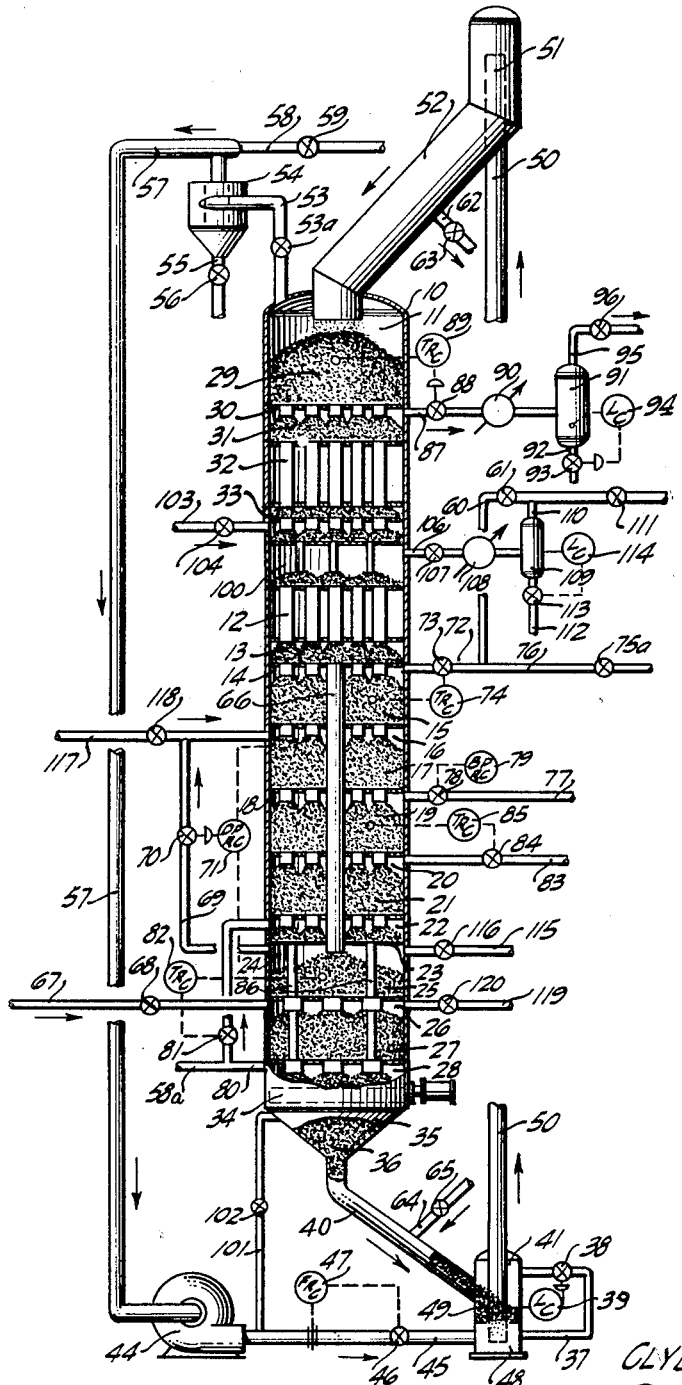
INVENTOR.
CLYDE H. O. BERG,
By Ross J. Garofalo
ATTORNEY Patented Jan. 23, 1951

2,539,005

UNITED STATES PATENT OFFICE 2,539,005

ADSORPTION PROCESS

Clyde H. O. Berg, Long Beach, Calif., assignor to Union Oil Company of California, Los Angeles, Calif., a corporation of California Application April 30, 1949, Serial No. 90,709

28 Claims. (Cl. 183—4.2)

This invention relates to a process for the continuous separation of gaseous mixtures into a plurality of substantially pure fractions through selective adsorption of such mixtures on moving beds of granular adsorbents. This invention further relates to an improved selective adsorption process in which the adsorbent, being recirculated through an adsorption column, is conveyed at near atmospheric temperature by a lifting medium comprising one of the higher density process gas streams involved in the separation of the gaseous mixture. In this manner a greater quantity of adsorbent may be conveyed per unit quantity of lift gas since the low temperature involved in the conveyance step gives the lift gas an increased density and viscosity. Applications, Serial Numbers 90,708 and 90,710, filed of even date herewith disclose related subject matter.

It is an object of the present invention to provide an improved selective adsorption process in which the adsorbent passes successively through zones of heating, sealing, cooling, adsorption, and rectification as it passes downwardly through the adsorption column.

An additional object of this invention is to provide an improved process in which the adsorbent removed from the bottom of the adsorption column comprises a rectified adsorbent saturated with more readily adsorbable constituents of the gaseous mixture and is conveyed in the presence of a lift gas containing such constituents.

Another object of this invention is to incorporate in the selective adsorption process an adsorbent conveyance method by means of which the rectified adsorbent is lifted by means of high density-high viscosity reflux gas whereby increased quantities of adsorbent are recirculated with decreased quantities of lift gas.

It is also an object of this invention to provide an apparatus to accomplish the foregoing objects.

Other objects and advantages of this invention will become apparent to those skilled in the art as the description thereof proceeds.

Briefly, this invention comprises an improved selective adsorption process in which a substantially compact moving bed of solid granular adsorbent flows downwardly by gravity successively through zones of secondary rectification, desorption, heating, sealing, cooling, and subsequently through a separation zone containing one or more adsorption and rectification zones. The adsorbent is withdrawn from a point below the separation zone and this partially rectified adsorbent is recirculated for reintroduction into the secondary rectification zone and repassage through the column. The separation zone may be considerably modified to contain one or more adsorption and rectification zones. It may be provided with means for dividing the adsorbent flowing therethrough into at least two separate and independent adsorbent streams to obtain special degrees of rectification and separation of the gaseous mixtures into a plurality of substantially pure product streams. Such a modification of the separation zone will be hereinafter more fully described.

A gaseous mixture to be separated is introduced into the separation zone where the adsorbent is enriched with the more readily adsorbable constituents of the gaseous mixture forming a rich adsorbent and leaving a substantially unadsorbed gas. The rich adsorbent is then partially rectified in the presence of a reflux gas to remove less readily adsorbable constituents. It is then removed from the bottom of the column and is suspended in a lift gas having the same composition as the reflux gas used in rectification for conveyance to the top of the column for passage through the secondary rectification zone and the subsequent treating zones in the column. In the secondary rectification zone at the top of the column, the rich gas reflux contacts the partially rectified adsorbent desorbing a primary reflux gas which is further used for rectification at the bottom of the separation zone and also for lifting the adsorbent. The rectified adsorbent removed from the rectification zone passes into the preferential desorption zone. Herein the preferential adsorption of a stripping gas causes desorption of the most readily adsorbable constituents from the adsorbent to form a rich gas product. The partially stripped adsorbent thus formed passes downwardly through the heating zone wherein the adsorbent temperature is raised and the adsorbent is countercurrently contacted with further quantities of stripping gas introduced at a point below the heating zone to desorb remaining quantities of rich gas. The hot lean adsorbent passes from the heating zone through a seal gas removal zone into an indirect cooling zone. The purge gas, comprising a fraction of the lean gas product and containing the least readily adsorbable constituents of the gaseous mixture, passes upwardly through the cooling zone countercurrent to the downwardly flowing lean adsorbent therein. This purge gas serves to remove traces of stripping gas adsorbed on the adsorbent and also to prevent that minor portion of the stripping gas which enters the sealing gas removal zone concurrently with the adsorbent from passing into the cooling zone wherein it would rapidly be adsorbed and condensed thereby seriously effecting the adsorbent flow characteristics. A mixture of stripping gas and purge gas is formed in the sealing gas removal zone and this seal gas is removed therefrom at such a rate as to maintain a pressure within the seal gas removal zone which is somewhat less than either pressure existing in the heating and cooling zone. By this method the stripping gas present in the heating zone is prevented from deleteriously affecting the adsorbent flow characteristics in the cooling zone and the purge gas passing through the cooling zone is prevented from entering and contaminating the rich gas product removed from the heating zone. The cooled lean adsorbent passes from the cooling zone downwardly through the separation zone wherein it is contacted by the feed gas to be separated. The lowermost zone in the separation zone is one of rectification employing the primary reflux gas desorbed from the secondary rectification zone as a reflux gas and which is also employed as a lift gas. The gas thus desorbed is removed from the top of the column where it is formed and recirculated to a point adjacent to the bottom of the column where the partially rectified adsorbent is, in one modification, introduced into the lift gas stream forming a suspension. This suspension is then conveyed to a point above the top of the column wherefrom the adsorbent is returned to the secondary rectification zone. A controlled quantity of lift gas is introduced from this recirculating lift gas stream as a primary reflux gas into the bottom of the separation zone. These are two of the advantages realized according to this invention, the control of primary reflux gas introduced into the separation zone and the utilization of a high molecular weight fraction of the gaseous mixture as a lift gas. Other advantages include the elimination of extensive expansion joint provisions in the lift line through which the adsorbent is conveyed, the recirculation of a lift gas of considerably increased density and viscosity and consequently greater suspending powers for the adsorbent, and the simplification of blowing apparatus required for recirculation of low temperature lift gas which this system permits.

To facilitate illustration of the present invention and the description of the process and apparatus thereof a drawing is included in which a combination schematic flow diagram of the improved selective adsorption process and a vertical cross section elevation of the improved selective adsorption column is shown.

Referring now more particularly to the drawing, selective adsorption column 10 is provided at successively lower levels therein with elutriation zone 11, secondary rectification zone 29, rich gas disengaging zone 30, preferential desorption or steaming zone 31, indirect heating zone or stripper 32, stripping gas engaging zone 33, seal gas removal zone 100, indirect cooler 12, hopper zone 13, lean gas disengaging zone 14, secondary adsorption zone 15, secondary feed gas engaging zone 16, first side cut rectification zone 17, first side cut gas disengaging zone 18, second side cut rectification zone 19 which may be also termed "first side cut desorption zone 19," second side cut disengaging zone 20, second side cut desorption zone 21, primary reflux gas engaging zone 22, column divided 23, secondary feed disengaging zone 24, primary adsorption zone 25, feed gas engaging zone 26, primary rectification zone 27, primary reflux gas disengaging zone 28, feeder zone 34 and bottom zone 35. That portion of column 10 included between hopper zone 13 and adsorbent feeder zone 28 may be termed the separation zone in which the modification shown in the drawing is one of several to be subsequently described. That part of the separation zone between zone 13 and column divider 23 is known as a side cut gas zone or secondary separation zone while the remaining part of the separation zone between column divider 23 and feeder zone 28 is known as a feed gas zone or primary separation zone in the modification shown.

In the separation zone shown on the drawing, two separate and individual streams of granular adsorbent are employed, one each passing through the primary and secondary separation zones. The adsorbent passing from zone 13 is divided into these two streams which are subsequently combined as they pass through zone 28 and feeder zone 34 into bottom zone 35. From here the adsorbent is conveyed to the top of the column for introduction into secondary rectification zone 29. From this point the adsorbent is heated to effect desorption of the rich gas, passed through a sealing zone from which a seal gas is removed, then passed through a cooling zone to form a cool lean adsorbent and into the separation zone to complete the cycle. The adsorbent is recirculated in this manner through the column.

In bottom zone 35 an accumulation of adsorbent 36 is maintained by the cooperative action of level control 39 and control valve 38 whereby transfer line 40 is maintained full of flowing adsorbent. If desired, level control 39 may be positioned in bottom zone 35. In another modification transfer line 40 may be maintained only partially full of flowing adsorbent so that part of the lift gas may pass directly from zone 41 into bottom zone 35. The adsorbent passes from accumulation 26 via transfer line 40 into induction zone 41. A lift gas is introduced under pressure exerted by lift gas blower 44 via line 45 controlled by valve 46 under the action of flow recorder controller 47 into lift gas inlet zone 48 of induction zone 41. The lift gas passes upwardly through solids inlet zone 49, picking up the adsorbent, forming a suspension and passes via lift line 50 into impactless separator 51. Herein the adsorbent suspension is broken and the adsorbent and lift gas pass as substantially independent phases through transfer line 52 to collect in the upper portion of column 10. The lift gas then passes from column 10 via line 53 controlled by valve 53a into separator 54 wherein suspended adsorbent fines, elutriated from the adsorbent in zone 11 are separated to be removed via line 55 controlled by valve 56. The fines-free lift gas then passes via lift gas return line 57 to the suction inlet of blower 44 for recirculation. Accumulations of lift gas in this cycle are withdrawn continuously via line 58 controlled by valve 59. If desired, all or part of this gas may be combined with the primary reflux gas introduced by means of line 101 controlled by valve 102 into bottom zone 35 whereby a controlled quantity of primary reflux gas is introduced into the bottom of the separation zone and any accumulation or excess thereof may be removed via lines 80 and 58a.

During operation, it is desirable to remove accumulations of high molecular weight constituents from the adsorbent such as are formed by polymerization of acetylene or components such as normally liquid hydrocarbons present in the feed gas. To accomplish this about 5% or so of the adsorbent circulated is removed from transfer line 52 by means of line 62 controlled by valve 63 and is passed through a high temperature reactivator in which the adsorbent is contacted with reactivation steam while being heated to a temperature of from 500° F. to 2000° F. or higher. The desorbable materials are removed from the adsorbent at the lower reactivation temperatures and may be combined with the rich gas product. For desorption of high molecular weight constituents the reactivator operates at about 1000°–1100° F. which is just below the carbon gasification temperature. When the adsorbent activity is lowered, the reactivator temperature is increased to 1700°–1800° F. for a sufficient period of time to restore the desired activity or adsorptive capacity of the adsorbent and then returned to 1000°–1100° F. A preferential water gas reaction occurs at the higher temperatures whereby the high molecular weight nondesorbable hydrocarbons are converted to carbon monoxide and hydrogen leaving the adsorbent in a reactivated state. It is then combined via line 64 controlled by valve 65 with adsorbent flowing via transfer line 40 into lift line 50.

The description of the apparatus of this invention and the process involved in separating a gaseous mixture thereby into four substantially pure fractions, including ethylene and propylene concentrates, may be more readily understood from the following description which is in the form of a practical example. Although the example is directed to the separation of hydrocarbon gases, the process is not to be considered as limited only to the separation of such gases since the description is merely an illustration of the operation whereby two rectified and substantially pure heart cut or side cut fractions are obtained.

EXAMPLE I

A selective adsorption column 12.0 feet in diameter and designed according to the accompanying drawing utilizes activated vegetable charcoal circulated at a rate of 330,000 pounds per hour. The charcoal has a mesh size range of 12 to 30. The charcoal circulation is divided into two streams at zone 13 and 230,000 pounds per hour pass directly into secondary adsorption zone 15 for passage through the secondary separation zone and the remaining 100,000 pounds per hour pass downwardly through and independent of the secondary separation zone through conduit 66 for introduction into primary adsorption zone 25 and subsequently through the primary separation zone. The feed gas, a cracked petroleum hydrocarbon gas mixture flowing at a rate of 2141 pound mols per hour, has the following composition:

TABLE 1

Feed gas composition

| Constituent: | Mol per cent |
|---|---|
| Hydrogen | 17.86 |
| Methane | 40.11 |
| Ethylene | 9.15 |
| Ethane | 24.88 |
| Propylene | 2.42 |
| Propane | 4.13 |
| Butenes | 0.34 |
| Butanes | 0.65 |
| $C_5$'s | 0.21 |
| $C_6+$ | 0.25 |
| Total | 100.00 |

The feed gas in introduced at a pressure of 150 pounds per square inch gauge via line 67 at a rate controlled by valve 68 into feed gas engaging zone 26. It contacts 100,000 pounds per hour of activated carbon in primary adsorption zone 25 wherein the $C_3$ and higher molecular weight hydrocarbons are adsorbed together with a small proportion of $C_2$ and lower molecular weight hydrocarbons to form a rich charcoal leaving $C_2$ and lower molecular weight hydrocarbons substantially unadsorbed. In primary adsorption zone 25, a $C_2$—$C_3$ separation is made in the presence of $C_1$ hydrocarbon which has been found to facilitate the separation by reducing the charcoal rate required. The $C_2$ and lower molecular weight constituents form a secondary feed gas and are removed from secondary feed disengaging zone 24 and passed via line 69 controlled by valve 70 into secondary feed engaging zone 16 in the secondary separation section. The treatment of the rich charcoal formed in primary adsorption zone 25 will be subsequently described.

Valve 70 controlling the rate of secondary feed introduction is actuated by differential pressure controller 71 to maintain a constant differential pressure between disengaging zone 24 and engaging zone 16. The secondary feed, comprising substantially all the $C_2$ and lower molecular weight constituents, is countercurrently contacted by 230,000 pounds per hour of carbon in secondary adsorption zone 15. The $C_2$ hydrocarbon fraction together with a small quantity of $C_1$ hydrocarbon is adsorbed in secondary adsorption zone 15 to form a second rich charcoal and the major proportion of hydrogen and $C_1$ hydrocarbon is substantially unadsorbed. This $C_1$—$C_2$ hydrocarbon separation is effected here in the absence of the $C_3$ hydrocarbons which has been found to be an advantage. The $C_3$ hydrocarbons were adsorbed and removed from the gas stream during passage through primary adsorption zone 25. This unadsorbed gas accumulates in lean gas disengaging zone 14 and a lean gas product stream is removed therefrom via line 72 at a rate controlled by valve 73 which in turn is actuated by temperature recorder controller 74 having thermocouple point 75 in contact with the adsorbent in zone 15. The lean gas product flows at a rate of 1241 pound mols per hour, is sent to storage or further processing facilities not shown by means of line 76, and has the composition given below:

TABLE 2

Lean gas product composition

| Constituent: | Mol per cent |
|---|---|
| Hydrogen | 30.81 |
| Methane | 69.03 |
| Ethylene | 0.06 |
| Ethane | 0.10 |
| Total | 100.00 |

If desired, a $H_2$—$C_1$ separation can be made in secondary adsorption zone 15 whereby the lean gas product comprises substantially pure hydrogen. Such a separation requires a higher charcoal rate in the secondary separation zone since the $C_1$ hydrocarbon is adsorbed along with the $C_2$ hydrocarbons from the hydrogen.

A portion of the unadsorbed gas comprising the lean gas product passes upwardly through zone 13 through cooling zone 12 as a purge gas. Here the cool lean charcoal is saturated with hydrogen and methane and the purge gas passes on to sealing gas removal zone 100 wherefrom it is removed via line 106 together with a portion of the stripping gas thereby preventing the stripping gas from contaminating the adsorbent present in the cooling zone. This operation will be described subsequently.

The second rich charcoal formed in secondary adsorption zone 15 passes downwardly into first side cut rectification zone 17. Herein the charcoal is contacted with a reflux gas comprising substantially pure $C_2$ hydrocarbons. A preferential desorption of adsorbed $C_1$ hydrocarbon results, the desorbed $C_1$ hydrocarbon passing upwardly to combine with the lean gas product and a second partially rectified charcoal substantially free of $C_1$ and lower molecular weight constituents is formed. This charcoal passes downwardly into second side cut rectification zone 19 wherein the second partially rectified charcoal is contacted by a countercurrent flow of $C_3$ hydrocarbon reflux. The preferential desorption of $C_2$ hydrocarbons by the $C_3$ hydrocarbons is herein effected. Part of the $C_2$ hydrocarbons are employed as above described as the $C_2$ reflux in first side cut rectification zone 17 and are eventually removed with the remaining part of $C_2$ hydrocarbons from first side cut disengaging zone 18 via line 77 controlled by valve 78 in turn regulated by back pressure recorder controller 79. The first side cut gas product passes via line 77 at a rate of 730 pound mols per hour to further processing facilities or storage not shown and has the following composition:

TABLE 3

*First side cut gas composition*

| Constituent: | Mol per cent |
|---|---|
| Methane | 0.29 |
| Ethylene | 26.74 |
| Ethane | 72.77 |
| Propylene | 0.09 |
| Propane | 0.11 |
| Total | 100.00 |

The charcoal in second side cut rectification zone 19, from which the $C_2$ hydrocarbons have been desorbed and which contain only $C_3$ hydrocarbons substantially uncontaminated by higher or lower molecular weight constituents, passes downwardly into second side cut desorption zone 21. A primary reflux gas containing $C_3$ and $C_4$ hydrocarbon constituents formed in secondary rectification zone 29, as hereinbelow more fully described, passes via line 30 at a rate controlled by valve 81 and actuated by temperature recorder controller 82 into primary reflux gas engaging zone 22. This gas passes upwardly countercurrent to the partially rectified charcoal present in second side cut desorption zone 21 to preferentially desorb the $C_3$ constituents while adsorbing the $C_4+$ hydrocarbon constituents. The thus desorbed $C_3$'s are partially employed as the aforementioned $C_3$ reflux in second side cut rectification zone 19 and the remainder is removed from second side cut disengaging zone 20 via line 83 at a rate controlled by valve 84 and temperature recorder controller 85 at a rate of 140 pound mols per hour. This second side cut gas product has the following composition:

TABLE 4

*Second side cut gas composition*

| Constituent: | Mol per cent |
|---|---|
| Ethylene | 0.07 |
| Ethane | 0.13 |
| Propylene | 36.66 |
| Propane | 62.64 |
| Butenes | 0.20 |
| Butanes | 0.30 |
| Total | 100.00 |

The second rectified charcoal, substantially saturated with $C_4$ and higher molecular weight hydrocarbons and substantially free of $C_3$ hydrocarbons, passes downwardly through primary reflux gas engaging zone 22, through and independent of the primary separation zone via conduits 86, and into feeder zone 34. This stream of rectified charcoal is combined at a point just above feeder zone 34 with charcoal flowing through primary reflux gas disengaging zone 28 from the primary separation zone. The combined stream of charcoal is conveyed as above described to secondary rectification zone 29.

The rich charcoal present in primary adsorption zone 25 contains $C_3$ and higher molecular weight hydrocarbons together with a small proportion of $C_2$ and lighter constituents. It passes into primary rectification zone 27 wherein the charcoal is contacted by a countercurrent flow of part of the aforementioned primary reflux gas. The $C_2$ and lighter molecular weight constituents are preferentially desorbed to form a first partially rectified charcoal. This charcoal is combined with that removed from the bottom of the secondary separation zone and introduced directly into feeder zone 34.

In secondary rectification zone 29 the partially rectified carbon is contacted with a countercurrent reflux gas containing $C_4$ and higher molecular weight hydrocarbons. A preferential desorption of substantially all of the $C_3$ hydrocarbons is effected forming a gas containing $C_3$ hydrocarbons as the lowest molecular weight constituents and also containing some $C_4$ and higher molecular weight constituents. This gas is the primary reflux gas which is employed as above described.

The rectified charcoal removed from the bottom of secondary rectification zone 29 passes into preferential desorption zone or steaming zone 31. Herein the rectified charcoal is contacted with a countercurrent flow of steam which is preferentially adsorbed at the temperature of the carbon causing an immediate desorption of the major proportion of the $C_4$ hydrocarbon constituents as well as a partial desorption of the higher molecular weight constituents leaving a partially stripped charcoal. The desorbed gases are partly introduced into secondary rectification zone 29 as reflux to be preferentially adsorbed therein while the remainder is removed via line 87 controlled by valve 88 which in turn is actuated by temperature recorder controller 89. The rich gas is introduced into cooler 90 wherein the stripping steam is condensed. The condensate is separated from the cooled rich gas in separator 91 from which it is removed via line 92 controlled by valve 93 under action of liquid level controller 94. The rich gas product from which the major proportion of stripping gas has been removed passes from separator 91 via line 95 controlled by valve 96.

The partially stripped charcoal, saturated with stripping steam, passes from preferential desorption zone 31 downwardly through the tubes of indirect heater 32 through which an upward flow of stripping gas is maintained. Stripping steam is introduced into stripping gas engaging zone 33 via line 103 controlled by valve 104, a portion of which passes downwardly concurrently with the charcoal into seal gas removal zone 100 while the major proportion passes upwardly through the tubes of indirect heater 32. The temperature to which the carbon is heated during passage through stripper 32 is between 500° F. and 600° F. Here substantially all of the adsorbed $C_4$ hydrocarbons are removed from the adsorbent and are combined with the rich gas product described above.

These 500° F. to 600° F. temperatures are insufficient to remove all of the $C_5$ and $C_6$ hydrocarbons adsorbed on the carbon. To effect the removal of these higher molecular weight hydrocarbons and to reactivate the carbon by removing traces of nondesorbable constituents, a small portion of the circulating charcoal stream is conveyed through the reactivation zone, not shown, but described above. The steam plus desorbed hydrocarbons removed from the reactivator at about 1000° F. are passed through a cooler in much the same way as the rich gas removed from the stripper 32. Hydrocarbon constituents are thus separated from the stripping gas by condensation and/or decantation or distillation, if desired, and are combined with the rich gas removed via line 95 from separator 91. The combination of the thus desorbed higher molecular weight hydrocarbons comprises the rich gas product in this particular operation. These constituents are produced at the rate of 30 pound mols per hour and have the following composition:

TABLE 5

*Rich gas product composition*

| Constituent: | Mol per cent |
|---|---|
| $C_3$'s | 0.20 |
| $C_4$'s | 66.74 |
| $C_5$'s | 15.18 |
| $C_6+$ | 17.88 |
| Total | 100.00 |

Seal gas removal zone 100 is provided with a series of tubes 105 through which the adsorbent flows. The purpose of these tubes is to provide a resistance to the flow of stripping gas so that the major proportion thereof will pass upwardly into heating zone 32. The flow of stripping gas downwardly through tubes 105 prevents the upward flow of purge gas into heating zone 32 which would otherwise contaminate the rich gas product. A mixture of stripping gas and purge gas thus formed comprises the seal gas and is removed from zone 100 via line 106 controlled by valve 107 which passes through cooler 108 and subsequently into separator 109. Herein the stripping gas is condensed and the purge gas constituents are removed via line 110 controlled by valve 111 or it may be combined with the lean gas by introduction through line 69. The condensed stripping steam is removed from separator 109 via line 112 controlled by valve 113 which is actuated by level controller 114.

From seal gas removal zone 100 the hot stripped adsorbent passes directly into cooler 112 wherein the adsorbent is cooled indirectly in the presence of a countercurrent flow of purge gas which strips remaining traces of adsorbed steam from the adsorbent.

The primary reason for the improved operation of the process above described is the utilization of a lift gas which comprises one of the higher molecular weight gases involved in the selective adsorption process. This lift gas is at a temperature of between 100° F. and 150° F. in distinction to previous operations wherein a lift gas of 500° F. to 600° F. was employed. This increases the lifting properties of the lift gas permitting lower velocities of gas in lift line 50, decreased charcoal attrition rates, increased charcoal-lift gas ratios in the lift line, and materially simplified construction of apparatus such as the lift line and lift gas blower.

The lean gas product contains only 0.16% impurities and comprises 99.84% of a mixture of hydrogen and methane. The first side cut is a 99.51% pure $C_2$ hydrocarbon consisting approximately of 25% ethylene and 75% ethane. The second side cut comprises a 99.30% pure $C_3$ hydrocarbon fraction containing over 30% propylene. The unusually high purity of these fractions is attributed to the manner in which they are separated from the feed gas, the separation of $C_1$ from $C_2$ hydrocarbon in the absence of $C_3$ hydrocarbons, the separation of $C_2$ and $C_3$ hydrocarbons in the absence of $C_1$ hydrocarbon, the sealing of the heating zone from the cooling zone, and the improved method of adsorbent circulation.

EXAMPLE II

As an example of previous operations in the separation of this gaseous mixture wherein the $C_3$ and $C_4$ hydrocarbons are separated as a rich gas, the $C_2$ hydrocarbons are separated as a single side cut gas and the methane and hydrogen are separated as a lean gas product, a charcoal rate of between 360,000 and 370,000 pounds per hour is required. Further, between 25% and 30% more lift gas circulation is required in lifting the same amount of charcoal with hot lean lift gas compared to the process of the present invention. Thus the improved separation by means of the process above described is at once apparent.

The foregoing examples have shown the use of a separation zone which is complex in arrangement to permit the production of four substantially pure fractions. However, the process of this invention may be modified to effect simplification of the separation zone whereby two or only three products are prepared from the gaseous mixture.

EXAMPLE III

In one modification of the separation zone a single stream of adsorbent is employed which passes successively through one adsorption zone and one rectification zone. In this instance the feed gas may be introduced via line 67 into primary adsorption zone 25 and with valve 70 closed, the lean gas is removed via line 115 controlled by valve 116. With valve 81 closed zones 27 and 29 comprise a single rectification zone wherein the rich adsorbent is rectified to free it of less readily adsorbable constituents. The rectified adsorbent is subsequently treated as above described to produce a rich gas product therefrom. In this modification the entire upper portion of the separation zone is not used and valves 70, 73, 78, 81, 84, 118 and 120 are closed. Valves may be also provided in lines 86 to prevent movement of adsorbent through the secondary separation zone. A reflux gas is again used for lifting the adsorbent.

EXAMPLE IV

A similar operation may be carried out in the upper portion of the column separately or simultaneously with the separation described in Example III by introducing a feed gas, which may be different or the same as the feed gas introduced below in the primary separation zone described in Example III, via line 117 controlled by valve 118 into engaging zone 16. A lean gas is removed as in Example I from zone 14 and the rich adsorbent subsequently passes into zone 17 for rectification or directly through zones 17, 19 and 21 and the lift line into primary rectification zone 29. Thus in the apparatus shown on the drawing two simultaneous simple separations may be made. This modification is particularly adaptable to the separation of two gases containing the same more readily adsorbable constituents so that from the two feed gases, one rich gas product is prepared and two or more lighter gas products.

EXAMPLE V

In addition to the simple separation, where two products only are produced, provision may be made in the secondary separation zone for the production of one or more side cut products. In this case the feed gas is introduced via line 117, the lean gas is removed as before via line 72, the rich adsorbent is rectified with a side cut gas reflux in zone 17, rich gas reflux is introduced via line 80 into zones 19 and 21 which act in this modification as a single rectification zone wherein valve 84 is closed, the side cut gas constituents are desorbed and removed via line 77, and the rectified adsorbent passes via lines 86 into the lift line for conveyance to the primary rectification zone 29. From here the rich rectified adsorbent passes into the heating zone and the rich gas product is desorbed. In this modification a feed gas introduced into the secondary separation zone is separated into two fractions in addition to the rich gas product. It is of interest to note that this side cut operation may be carried on simultaneously with a simple separation of feed introduced via line 67 into the primary separation zone. Thus two feed gases may be processed simultaneously in a single column permitting unusual flexibility of operation in the separation of feed gases having compositions which vary with time.

EXAMPLE VI

Another modification of the separation zone permits the production of a single rectified side cut in addition to the lean gas and rich gas products. In this modification the feed gas enters zone 16 via line 117 and contacts one stream of adsorbent flowing through secondary separation zone and a lean gas product is produced via line 72. Valves 68, 70, 78, 81, 84 and 120 are closed. The rich adsorbent thus formed passes via lines 86 and lift line 50 into rectification zone 29 wherein it is contacted with a rich gas reflux and constituents present in the side cut gas are thereby desorbed. Zones 25 and 27 are in this case a single rectification zone, zones 17, 19, and 21 are not used, and the rectified side cut is removed via line 115 controlled by valve 116. Thus the feed gas is contacted with a first portion of the adsorbent and a second portion of adsorbent is employed to adsorb the more readily adsorbable constituents from a gas desorbed from the combined stream of adsorbent leaving a rectified side cut from which both less readily and more readily adsorbable constituents have been substantially completely removed.

EXAMPLE VII

In a further modification of the separation zone two individual streams of adsorbent are employed as in Example VI except that a primary and a secondary reflux gas are employed. The feed gas is introduced via line 117 into zone 16 to contact a first adsorbent stream. The lean gas product is removed via line 72. Valves 78 and 84 are closed making zones 17, 19 and 21 a single rectification zone into which a primary reflux is introduced via line 80. The combined adsorbent is treated in zone 29 by a rich gas reflux from which the primary reflux is desorbed for use as lift gas as well as reflux. Valves 68 and 116 are closed and part of the secondary reflux passes into zone 27 to contact the second adsorbent stream wherein the side cut gas is desorbed and more readily adsorbable constitutents are adsorbed. The side cut gas product is partly introduced into zone 25 wherein a secondary reflux gas is desorbed and which is conveyed via line 89 to the feed gas inlet in line 117 while the remainder of the side cut gas product passes via line 119 controlled by valve 120 to production.

In each of the foregoing examples the same steps of treating the rich adsorbent to desorb the rich gas product, the sealing of the heating zone from the cooling zone, the cooling of the hot lean adsorbent prior to introduction into the separation zone, and the utilization of a reflux gas stream in lifting the adsorbent from the bottom to the top of the column have been employed. Thus, in all the described modifications of the separation zone the same advantages are realized which are due to operating the heating, sealing and cooling zones in sequence as described, employing an intermediate fraction of the feed gas or reflux gas as a lift gas, and the variation in the separation zone. This enables a gaseous feed mixture to be separated into a number of different fractions according to this invention.

It is to be understood, however, that the specific separations of hydrocarbon gas mixtures used in the previous examples, is used here only in the purposes of clear description and that this invention of an improved apparatus and process for the separation by selective adsorption of gaseous mixtures applies equally well to other hydrocarbon or nonhydrocarbon gaseous mixtures.

For application to the selective adsorption process as herein described, granular adsorbents ranging from 12 to 20 mesh in size is preferred. However, other ranges of particle size are applicable, for example, 10–30 mesh. In some specific applications, granules as large as about two mesh are applicable and in certain other specific instances powdered adsorbents may be applied having small granules as fine as about 100 mesh or finer may be used. Of the various adsorbents which are applicable for use in the selective adsorption process as herein described, it is preferable to employ activated granular charcoal and particularly an activated vegetable charcoal with granules of from 12 to 20 mesh in size, although other adsorbents such as silica gel, activated aluminum oxide, activated bauxite, animal and mineral carbons, and various adsorbents prepared from iron, chromium and other metal oxides are applicable as adsorbents.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the separation of a gaseous mixture which comprises contacting said gaseous mixture in an adsorption zone with a moving bed of solid granular adsorbent forming a rich adsorbent containing the more readily adsorbable constituents and leaving a substantially unadsorbed lean gas containing the less readily adsorbable constituents, conveying said rich adsorbent in a lift gas comprising constituents of a reflux gas to a rectification zone, contacting said rich adsorbent with a portion of said more readily adsorbable constituents to desorb said reflux gas therefrom forming a rectified adsorbent, desorbing adsorbed constituents in a desorption zone as a rich gas product leaving a lean adsorbent, cooling said lean adsorbent and passing the same into said adsorption zone to contact further quantities of said gaseous mixture.

2. In a continuous adsorption process in which a substantially compact moving bed of adsorbent is circulated through a column, a feed gas is contacted with said adsorbent thereby adsorbing more readily adsorbable constituents forming a rich adsorbent, the adsorbed constituents are desorbed from the rich adsorbent as a rich gas product and the lean adsorbent remaining is recirculated to contact further quantities of said gaseous mixture, the improvement which comprises removing rich adsorbent from the bottom of said column after passage through said adsorption zone, contacting said rich adsorbent with a reflux gas whereby said adsorbent is conveyed to the top of said column, introducing the thus conveyed adsorbent into said desorption zone, and recirculating said reflux gas to convey further quantities of said rich adsorbent.

3. A process according to claim 2 wherein said reflux gas employed in conveying said rich adsorbent comprises a gas consisting essentially of constituents of intermediate adsorbability in said gaseous mixture.

4. A process according to claim 2 wherein a portion of said adsorbent circulating through said column is separated and passed through a reactivation zone, residual adsorbed constituents are removed from the adsorbent raising its adsorptive activity and the reactivated adsorbent is returned to the recirculating stream of adsorbent.

5. A process according to claim 2 in combination with the steps of separating a portion of adsorbent from the main stream recirculating through said column, passing this portion through a reactivation zone, heating the adsorbent during passage therethrough to reactivation temperatures to remove residual adsorbed materials forming a reactivated adsorbent and returning the reactivated portion to the main recirculating adsorbent stream.

6. A process according to claim 5 wherein the adsorbent comprises activated charcoal, said reactivation temperatures lie between about 500° F. and 2000° F. and said reactivation is conducted in the presence of steam.

7. A process according to claim 6 wherein the temperature of said reactivation is alternately maintained between about 500° F. and 1100° F. to strip adsorbed constituents from the reactivating charcoal and between about 1000° F. and 2000° F. to convert nondesorable constituents to carbon monoxide and hydrogen to maintain the adsorbent in a reactivated state.

8. In a gas separation process wherein a moving bed of solid granular adsorbent is passed downwardly by gravity through a vertical column containing a desorption zone, a sealing zone, a cooling zone and an adsorption zone, the gaseous mixture to be separated is passed countercurrently through said adsorption zone to form a rich adsorbent, said rich adsorbent is subsequently indirectly heated in the presence of a stripping gas to remove adsorbed constitutents leaving a hot lean adsorbent, and the hot lean adsorbent is cooled prior to being reintroduced into said adsorption zone, the improvement which comprises passing said hot lean adsorbent from said desorption zone through said sealing zone, removing a seal gas from said sealing zone consisting of a mixture of gases flowing thereinto from said cooling and desorption zones, subsequently passing the adsorbent through a cooling zone to form a cool lean adsorbent, passing said cool lean adsorbent through said adsorption zone, contacting said adsorbent with said gaseous mixture to form a rich adsorbent, removing said rich adsorbent from said column, contacting said rich adsorbent with a reflux gas containing constituents of intermediate adsorbability, and thereby conveying said rich adsorbent to the top of said column for passage through said desorption zone and the subsequent zones named.

9. In a gas separation process wherein a gaseous mixture is contacted with a moving bed of solid granular adsorbent leaving an unadsorbed lean gas and forming a rich adsorbent, the rich adsorbent is heated in the presence of a stripping gas forming a rich gas product and a hot lean adsorbent, the hot adsorbent is cooled in the presence of said lean gas, and the cool lean adsorbent is employed to contact further quantities of said gaseous mixture, the improvement which comprises passing a moving bed of solid granular adsorbent by gravity through a vertical column containing a desorption zone, a heating zone, a seal gas removal zone, a cooling zone and a separation zone, removing a portion of said stripping gas and a portion of said lean gas as a seal gas from said seal gas removal zone, removing rich adsorbent from the bottom of said separation zone and of said column, and conveying said rich adsorbent to the top thereof in the presence of a reflux gas as lift gas which contains the constituents of said gaseous mixture having intermediate degrees of adsorbability.

10. In a process for separating a gaseous mixture by selective adsorption of more readily adsorbable constituents on a solid granular adsorbent leaving less readily adsorbable constituents as a substantially unadsorbed lean gas, recovering adsorbed constituents as a rich gas from said adsorbent, and employing the adsorbent in a vertical column as a recirculating moving bed, the improvement which comprises passing the adsorbent successively by gravity through a heating zone, a seal gas removal zone, a cooling zone and a separation zone immediately prior to removing said adsorbent from said column, passing part of a stripping gas from said heating zone concurrently with said adsorbent into said seal gas removal zone, passing part of said lean gas countercurrent to said adsorbent through said cooling zone into said seal gas removal zone, removing the seal gas mixture thus formed from said seal gas removal zone, and conveying the adsorbent from said separation zone to said heating zone in the presence of a reflux gas containing constituents of intermediate adsorbability.

11. A process for separating a gaseous mixture which comprises passing a moving bed of solid granular adsorbent by gravity through a vertical column provided at successively lower levels therein with a rectification zone, a heating zone, a sealing zone, a cooling zone, and a separation zone, recirculating the adsorbent removed from said separation zone into said rectification zone, introducing said gaseous mixture into said separation zone, removing a lean gas from said separation zone, passing part of said lean gas upwardly through said cooling zone as a purge gas, introducing a stripping gas into said heating zone, removing a rich gas and said stripping gas from a point in said column above said heating zone, employing part of said rich gas as reflux in said rectification zone to desorb a gas containing constituents of intermediate adsorbability, employing part of the thus desorbed constituents as reflux in said separation zone, and employing the remaining part of said constituents as a lift gas for conveying adsorbent removed from the bottom of said column to the top thereof.

12. A process according to claim 11 wherein said adsorbent comprises activated vegetable charcoal and said stripping gas comprises steam.

13. A process according to claim 11 wherein said adsorbent removed from said separation zone is suspended in an upwardly flowing stream of reflux gas, the suspension thus formed is subsequently separated, the thus conveyed adsorbent gravitates into said rectification zone and the separated reflux gas in recirculated to suspend further quantities of adsorbent.

14. In a continuous process for separation of a gaseous mixture by flowing a moving bed of granular adsorbent by gravity through a vertical column, conveying adsorbent removed from the bottom of said column to the top thereof, contacting part of said moving bed with said gaseous mixture to form a rich adsorbent, subsequently heating and stripping adsorbed constituents from said rich adsorbent forming a rich gas and a hot lean adsorbent, then cooling said hot adsorbent prior to contacting further quantities of said gaseous mixture, the improvement which comprises flowing said moving bed of adsorbent by gravity through said column containing a rectification zone, a desorption zone, a seal gas removal zone, a cooling zone and an adsorption zone in succession, passing a stripping gas through said heating zone and a purge gas through said cooling zone, removing all of said purge gas and at least part of said stripping gas as a seal gas from said seal gas removal zone, and conveying rich adsorbent removed from said adsorption zone in the bottom of said column to said rectification zone in the top of said column in the presence of a reflux gas desorbed from the adsorbent in said rectification zone by said rich gas.

15. A process for separating a gaseous mixture which comprises flowing a moving bed of granular adsorbent successively through a secondary rectification zone, a preferential desorption zone, a heating zone, a seal gas removal zone, a cooling zone, and an adsorption zone by gravity and then through a conveyance zone back to said secondary rectification zone, passing said gaseous mixture through said adsorption zone forming a rich adsorbent and a substantially unadsorbed lean gas, subsequently contacting said adsorbent in said secondary rectification zone with a first portion of rich gas reflux containing constituents of higher adsorbability forming a rectified adsorbent and liberating a reflux gas containing constituents of intermediate adsorbability, passing part of said reflux gas into the bottom of said column, contacting the adsorbent removed from the bottom of said column with the remaining portion of said reflux gas thereby conveying said adsorbent to said secondary rectification zone, subsequently desorbing adsorbed constituents as a rich gas from said rectified adsorbent in said heating zone in the presence of a stripping gas to form a lean adsorbent, subsequently flowing said lean adsorbent successively through said seal gas removal zone and said cooling zone, passing a portion of said lean gas as a purge gas through said cooling zone in direct countercurrent contact with said adsorbent into said seal gas removal zone, passing a portion of said stripping gas from said heating zone into said seal gas removal zone to combine with said purge gas and form a seal gas, removing said seal gas from said seal gas removal zone, separating stripping gas therefrom, and combining the purge gas constituents remaining with said lean gas.

16. A process for separating a gaseous mixture which comprises passing a substantially compact moving bed of solid granular adsorbent by gravity successively through a desorption zone, a seal gas removal zone, a cooling zone and a separation zone containing an adsorption zone, recirculating adsorbent removed from said separation zone to said desorption zone, passing a gaseous mixture through said adsorption zone forming a rich adsorbent containing adsorbed constituents of intermediate and higher adsorbability and a substantially unadsorbed lean gas of less readily adsorbable constituents, subsequently contacting said adsorbent with a more readily adsorbable constituent reflux to desorb a primary reflux gas containing constituents of intermediate adsorbability leaving a rectified adsorbent, employing part of said primary reflux to convey adsorbent removed from said separation zone to said desorption zone, heating said rectified adsorbent in said desorption zone while contacting the heated adsorbent with a countercurrent flow of stripping gas to desorb a rich gas leaving a lean adsorbent, passing said lean adsorbent through said seal gas removal zone and through said cooling zone, passing a portion of said lean gas through said cooling zone countercurrent to said adsorbent, passing a portion of said stripping gas from said desorption zone concurrently with said adsorbent into said seal gas removal zone, combining said portion of lean gas with said portion of stripping gas in said seal gas removal zone to form said seal gas, and removing said seal gas therefrom.

17. A process according to claim 16 wherein said moving bed of solid granular adsorbent comprises activated vegetable charcoal.

18. A process according to claim 16 wherein said stripping gas comprises steam.

19. A process according to claim 16 wherein said separation zone comprises an adsorption zone and at least one rectification zone.

20. A process according to claim 16 wherein said adsorbent passing through said cooling zone into said separation zone is divided into a first and a second separate stream for passage through said separation zone as independent substantially compact moving beds, and said streams of adsorbent are withdrawn from said separation zone and combined prior to being removed from said column and conveyed to said desorption zone.

21. A process according to claim 20 wherein said gaseous mixture is contacted with said first stream of adsorbent leaving an unadsorbed gas, subsequently contacting said unadsorbed gas with said second stream of adsorbent, removing a lean gas product from said second stream, and desorbing remaining adsorbed constituents as a rich gas product from the combined adsorbent streams.

22. A process according to claim 20 wherein said gaseous mixture is contacted with said second stream of adsorbent leaving an unadsorbed lean gas product, desorbing a primary reflux gas containing said constituents of intermediate adsorbability from the combined adsorbent streams, and contacting said first stream with a part of said primary gas reflux thereby forming a side cut gas product, and desorbing a rich gas product from the combined adsorbent streams.

23. A process according to claim 20 wherein said gaseous mixture is contacted with said second stream of adsorbent leaving an unadsorbed lean gas product, a primary reflux gas containing said constituents of intermediate adsorbability is desorbed from the combined first and second adsorbent streams, said first stream is first contacted with a side cut gas reflux to desorb a secondary reflux gas, said second stream of adsorbent is contacted with said secondary reflux gas and, said first stream is subsequently contacted with a part of said primary gas reflux to form a side cut gas product, and a rich gas product is desorbed from the combined adsorbent streams.

24. A process according to claim 20 wherein said first and second streams of granular adsorbent are contacted in said separation zone with separate streams of gaseous mixtures to be separated and said gaseous mixtures both contain more readily adsorbable constituents to be produced as a single rich gas product.

25. A process according to claim 20 wherein said gaseous mixture is contacted with said first stream of adsorbent leaving an unadsorbed gas, subsequently contacting said unadsorbed gas with said second stream of adsorbent, removing a lean gas product from said second stream, subsequently desorbing at least one side cut gas product from said second stream of adsorbent, and desorbing remaining adsorbed constituents as a rich gas product from the combined first and second streams of adsorbent.

26. A process according to claim 20 wherein said gaseous mixture is contacted with said first stream of adsorbent leaving an unadsorbed gas, subsequently contacting said unadsorbed gas with said second stream of adsorbent, removing a lean gas product comprising the less readily adsorbable constituents of said gaseous mixture from said second stream, subsequently contacting said second stream with a second side cut gas reflux to desorb a first side cut gas product, subsequently contacting said second stream with a portion of said primary reflux gas to desorb said second side cut gas and desorbing remaining adsorbed constituents as a rich gas product therefrom from the combined first and second streams of adsorbent.

27. A process according to claim 26 wherein said first and second streams of adsorbent are each contacted with a portion of said primary reflux gas prior to being combined into a single stream of adsorbent.

28. An apparatus for separating a gaseous mixture which comprises a substantially vertical column provided at successively lower levels therein with a secondary rectification section, a preferential desorption section, a heating section, a seal gas removal section, a cooling section and a separation section at the bottom of said column, means for introducing a gaseous mixture into said separation section, means for removing a substantially unadsorbed lean gas product from said separation section and for passing a purge gas from said separation section through said cooling section into said seal gas removal section, means for introducing a stripping gas into said heating section, means for removing said purge gas and part of said stripping gas as a seal gas from said seal gas removal zone, means for removing more redily adsorbable constituents as a rich gas product from said preferential desorption section, means for recirculating a reflux gas desorbed by said rich gas in said secondary rectification section to the bottom of said column and means for conveying partially rectified adsorbent removed from said column to the top thereof in the presence of said reflux gas.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,825,707 | Wagner, Jr. | Oct. 6, 1931 |
| 1,836,301 | Bechthold | Dec. 15, 1931 |
| 2,351,214 | Kaufman et al. | June 13, 1944 |
| 2,379,195 | Simpson et al. | June 26, 1945 |
| 2,384,311 | Kearby | Sept. 4, 1945 |